(12) United States Patent
Chen et al.

(10) Patent No.: US 12,513,305 B2
(45) Date of Patent: Dec. 30, 2025

(54) ON LIST CONSTRUCTION OF CODED INFORMATION OF INTER PREDICTION

(71) Applicant: Tencent America LLC, Palo Alto, CA (US)

(72) Inventors: Lien-Fei Chen, Hsinchu (TW); Madhu Peringassery Krishnan, Mountain View, CA (US); Roman Chernyak, Santa Clara, CA (US); Biao Wang, San Jose, CA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/770,485

(22) Filed: Jul. 11, 2024

(65) Prior Publication Data

US 2025/0024045 A1    Jan. 16, 2025

Related U.S. Application Data

(60) Provisional application No. 63/526,437, filed on Jul. 12, 2023.

(51) Int. Cl.
*H04N 7/12* (2006.01)
*H04N 19/105* (2014.01)
*H04N 19/159* (2014.01)
*H04N 19/176* (2014.01)

(52) U.S. Cl.
CPC ......... *H04N 19/159* (2014.11); *H04N 19/105* (2014.11); *H04N 19/176* (2014.11)

(58) Field of Classification Search
CPC ................................................... H04N 19/176
See application file for complete search history.

(56) References Cited

U.S. PATENT DOCUMENTS

2022/0124343 A1   4/2022   Filippov et al.
2023/0016630 A1   1/2023   Hu

OTHER PUBLICATIONS

International Search Report and Written Opinion received for PCT Patent Application No. PCT/US2024/037895, mailed on Sep. 30, 2024, 9 pages.

*Primary Examiner* — Y Lee
(74) *Attorney, Agent, or Firm* — ArentFox Schiff LLP

(57) ABSTRACT

A method includes receiving a bitstream of coded information for a sequence of pictures, the coded information indicates an inter prediction of a current block in a current picture using a formular based inter prediction technique, the formular based inter prediction technique generates a prediction sample of the current block based on a formular with reconstructed samples of a reference block in a reference picture being input to the formular, the formular includes parameters derived based on a current template of the current block and a reference template of the reference block. The method also includes constructing a candidate list including one or more coded blocks associated with the current block, a coded block in the one or more coded blocks is a candidate that provides formular based inter prediction information.

20 Claims, 8 Drawing Sheets

ON LIST CONSTRUCTION OF CODED INFORMATION OF INTER PREDICTION

INCORPORATION BY REFERENCE

The present application claims the benefit of priority to U.S. Provisional Application No. 63/526,437, "On List Construction Of Coded Information Of Inter Prediction" filed on Jul. 12, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for video encoding/decoding. In some examples, an apparatus for video encoding/decoding includes processing circuitry.

Some aspects of the disclosure provide a method of video decoding. The method includes receiving a bitstream of coded information for a sequence of pictures, the coded information indicates an inter prediction of a current block in a current picture using a formular based inter prediction technique, the formular based inter prediction technique generates a prediction sample of the current block based on a formular with one or more reconstructed samples of a reference block in a reference picture being input to the formular, the formular includes one or more parameters derived based on a current template of the current block and a reference template of the reference block. The method also includes constructing a candidate list including one or more coded blocks associated with the current block, a coded block in the one or more coded blocks is a candidate that provides formular based inter prediction information of the formular based inter prediction technique. Further, the method includes selecting a first coded block from the candidate list, the first coded block is coded with first formular based inter prediction information of the formular based inter prediction technique. The method further includes determining current formular based inter prediction information for the current block based on the first formular based inter prediction information, deriving one or more parameter values of the one or more parameters for applying the formular based inter prediction technique on the current block according to the current formular based inter prediction information, and generating at least a prediction sample of the current block based on the formular that includes the one or more parameters being set according to the one or more parameter values.

In some examples, the one or more coded blocks include at least one of an adjacent spatial neighboring coded block, a non-adjacent spatial neighboring block and/or a temporal collocated coded block of the current block in the reference picture.

In some embodiments, the method includes constructing the candidate list from a first-in-first-out (FIFO) queue, the FIFO queue stores historical formular based inter prediction information of one or more historical coded blocks that are coded prior to the current block using the formular based inter prediction technique.

In some examples, the method includes storing the current formular based inter prediction information applied on the current block into the FIFO queue in a FIFO manner.

In some examples, the method includes at least one of resetting the FIFO queue at a beginning of a frame, resetting the FIFO queue at a beginning of a CTU row, resetting the FIFO queue at a beginning of a superblock SB) row, resetting the FIFO queue at a beginning of a slice, resetting the FIFO queue at a beginning of a tile, and/or resetting the FIFO queue at a beginning of a segment.

In some examples, the method includes decoding a first flag from the bitstream. When the first flag is true, the method includes decoding an index from the bitstream, the index indicating the first coded block in the candidate list. When the first flag is false, the method includes determining the current formular based inter prediction information without using the candidate list. In an example, when the first flag is false, the method includes decoding the current formular based inter prediction information of the formular based inter prediction technique from the bitstream. In another example, when the first flag is false, the method includes deriving the current formular based inter prediction information of the formular based inter prediction technique without additional signaling in the bitstream.

In some examples, the method includes constructing the candidate list according to a scanner order of at least one of at least an adjacent spatial neighboring coded block, a first-in-first-out (FIFO) queue storing prior coded blocks by the formular based inter prediction technique, at least a non-adjacent spatial neighboring block and/or a temporal collocated coded block of the current block in the reference picture.

In an example, the method includes checking whether the adjacent spatial neighboring coded block is coded with the formular based inter prediction technique, inserting the adjacent spatial neighboring coded block into the candidate list when the adjacent spatial neighboring coded block is coded with the formular based inter prediction technique, checking whether the FIFO queue is empty, inserting the FIFO queue into the candidate list when the FIFO queue is not empty, checking whether the non-adjacent spatial neighboring block is coded with the formular based inter prediction technique, inserting the non-adjacent spatial neighboring block into the candidate list when the non-adjacent spatial neighboring block is coded with the formular based inter prediction technique, checking whether the temporal collocated coded block of the current block in the reference picture is coded with the formular based inter prediction technique, and inserting the temporal collocated coded block into the candidate list when the temporal collocated coded block is coded with the formular based inter prediction technique.

In some examples, the method includes calculating template matching costs respectively for the one or more coded blocks and reordering the one or more coded blocks in the candidate list according to the template matching costs.

In some examples, the candidate list comprises a first candidate at a beginning position of the candidate list and the one or more coded blocks after the first candidate, the first candidate indicates a use of a derivation and/or a direct signaling of the current formular based inter prediction information. The method includes decoding an index from the bitstream, and when the index indicates the first candidate, determining the current formular based inter prediction information without using the formular based inter prediction information of the one or more coded blocks.

In an example, when the index indicates the first candidate, the method includes decoding the current formular based inter prediction information of the formular based inter prediction technique from the bitstream. In another example, the method includes deriving the current formular based inter prediction information of the formular based inter prediction technique without additional signaling from the bitstream.

In some examples, the method includes calculating template matching costs respectively for the one or more coded blocks and reordering the one or more coded blocks in the candidate list after the first candidate according to the template matching costs.

In some examples, the formular based inter prediction information comprises at least one of a template type and a formular type.

Some aspects of the disclosure provide a method of video encoding. The method includes determining to code a current block in a current picture by an inter prediction with a potential usage of a formular based inter prediction technique, the formular based inter prediction technique generates a prediction sample of the current block based on a formular with one or more reconstructed samples of a reference block in a reference picture being input to the formular, the formular includes one or more parameters derived based on a current template of the current block and a reference template of the reference block. The method also includes constructing a candidate list including one or more coded blocks associated with the current block. A coded block in the one or more coded blocks is a candidate that provides formular based inter prediction information of the formular based inter prediction technique for the inter prediction of the current block. The method also includes determining current formular based inter prediction information of the current block based on the candidate list and encoding the current block according to the current formular based inter prediction information. In an example, the method includes generating coded information of the current block to be included in a bitstream.

Some aspects of the disclosure provide a method of processing visual media data. The method includes processing a bitstream of visual media data according to a format rule. The bitstream includes coded information of a sequence of pictures, the coded information indicates an inter prediction of a current block in a current picture using a formular based inter prediction technique, the formular based inter prediction technique generates a prediction sample of the current block based on a formular with one or more reconstructed samples of a reference block in a reference picture being input to the formular, the formular includes one or more parameters derived based on a current template of the current block and a reference template of the reference block. The format rule specifies that a candidate list including one or more coded blocks associated with the current block is constructed, a coded block in the one or more coded blocks is a candidate that provides formular based inter prediction information of the formular based inter prediction technique. The format rule also specifies that a first coded block is selected from the candidate list, the first coded block being coded with first formular based inter prediction information of the formular based inter prediction technique, current formular based inter prediction information for the current block is determined based on the first formular based inter prediction information, one or more parameter values of the one or more parameters for applying the formular based inter prediction technique on the current block are determined according to the current formular based inter prediction information, and at least a prediction sample of the current block is generated based on the formular that includes the one or more parameters being set according to the one or more parameter values.

Aspects of the disclosure also provide an apparatus for video encoding or video decoding. The apparatus for video encoding/decoder including processing circuitry configured to implement any of the described methods for video encoding or video decoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
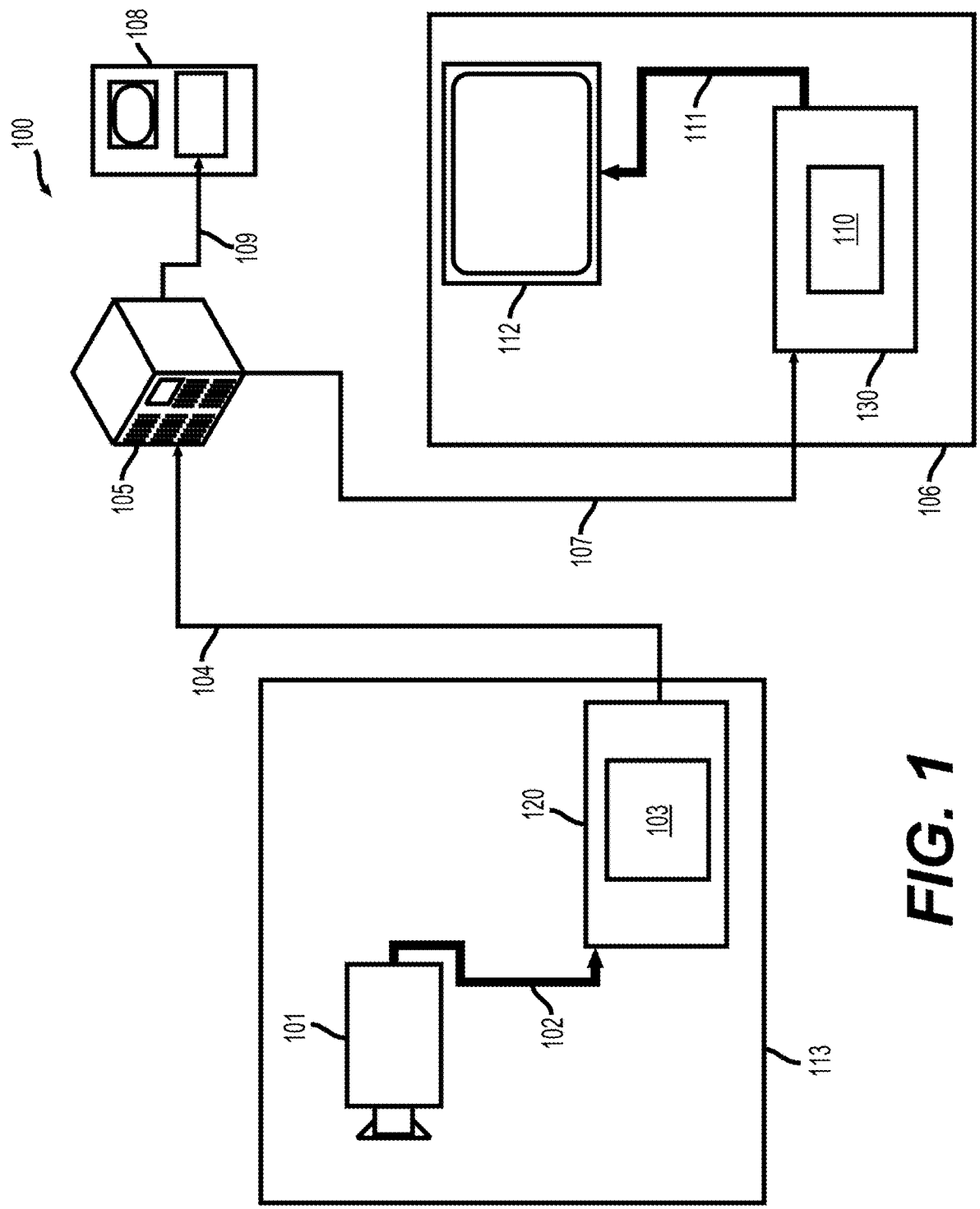
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
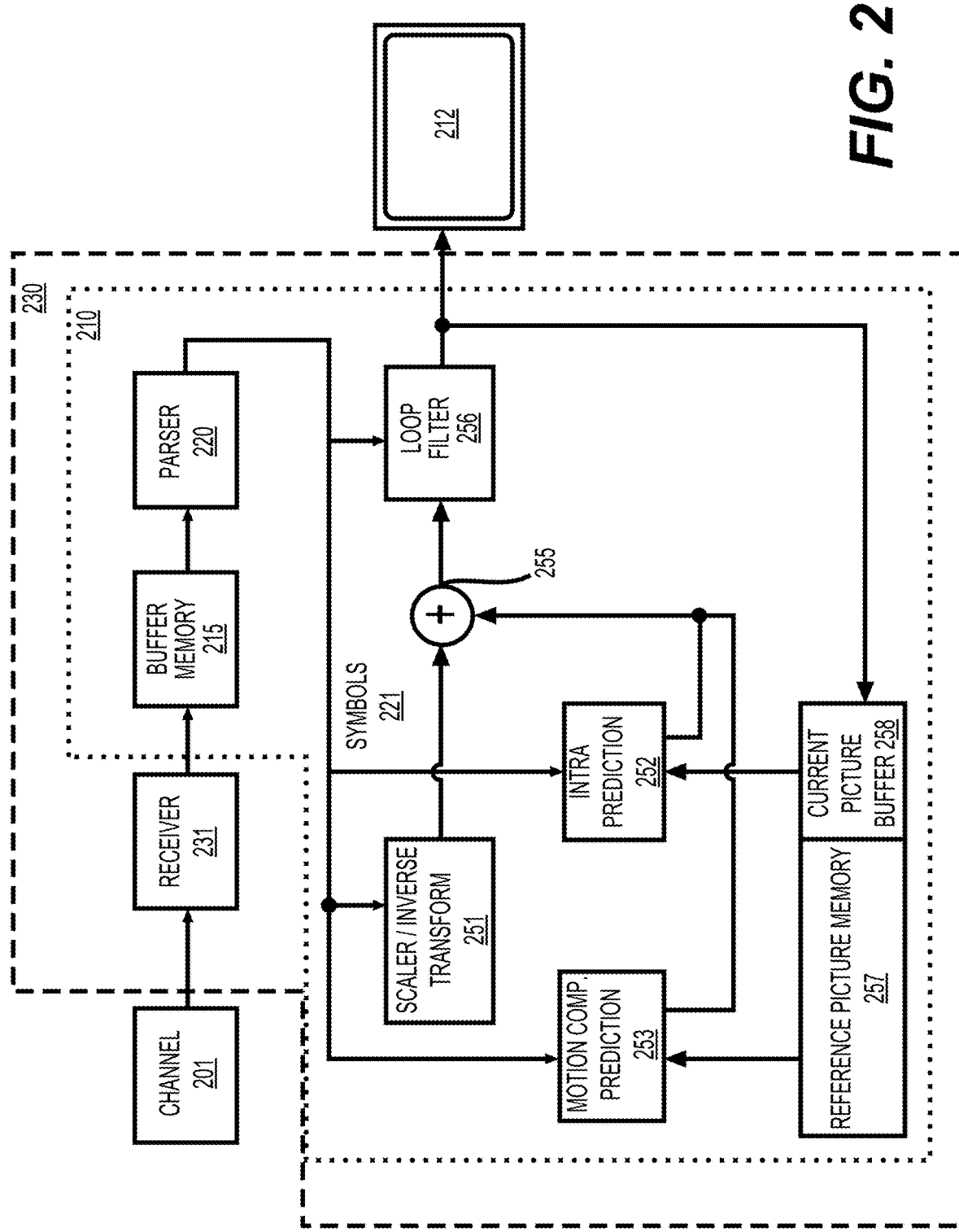
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
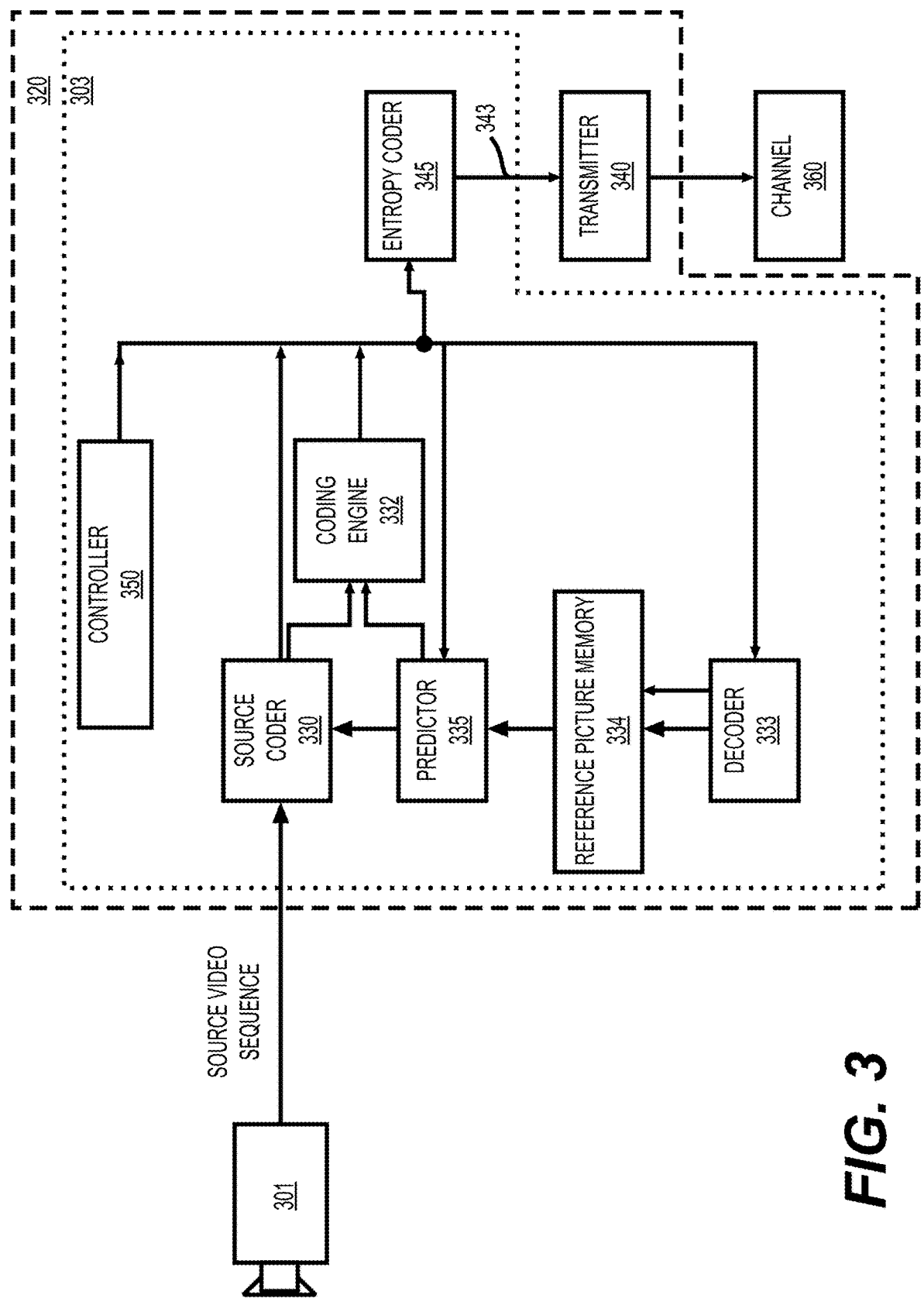
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

The present disclosure provides techniques for list construction of coded information in inter prediction coding.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

Figure 4:
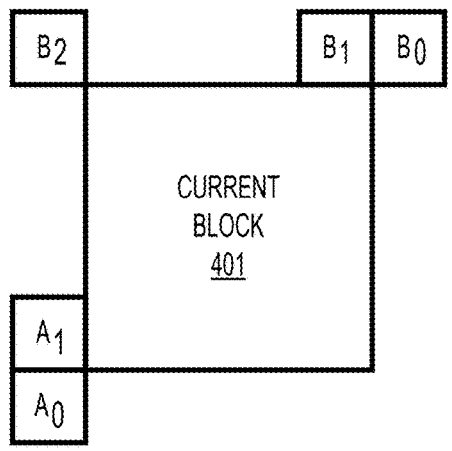
FIG. 4 shows positions of spatial merge candidates according to an embodiment of the disclosure.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

Figure 5:
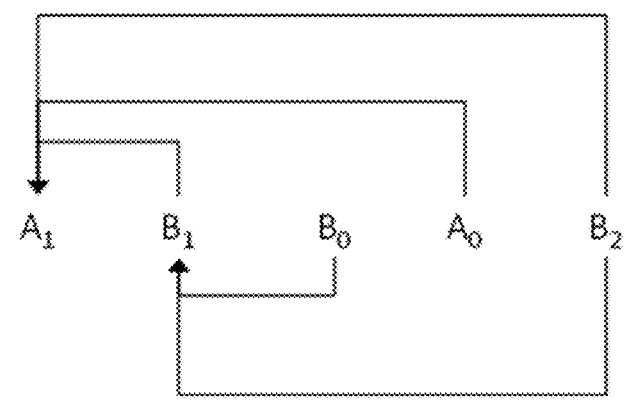
FIG. 5 shows candidate pairs that are considered for a redundancy check of spatial merge candidates according to an embodiment of the disclosure.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 6:
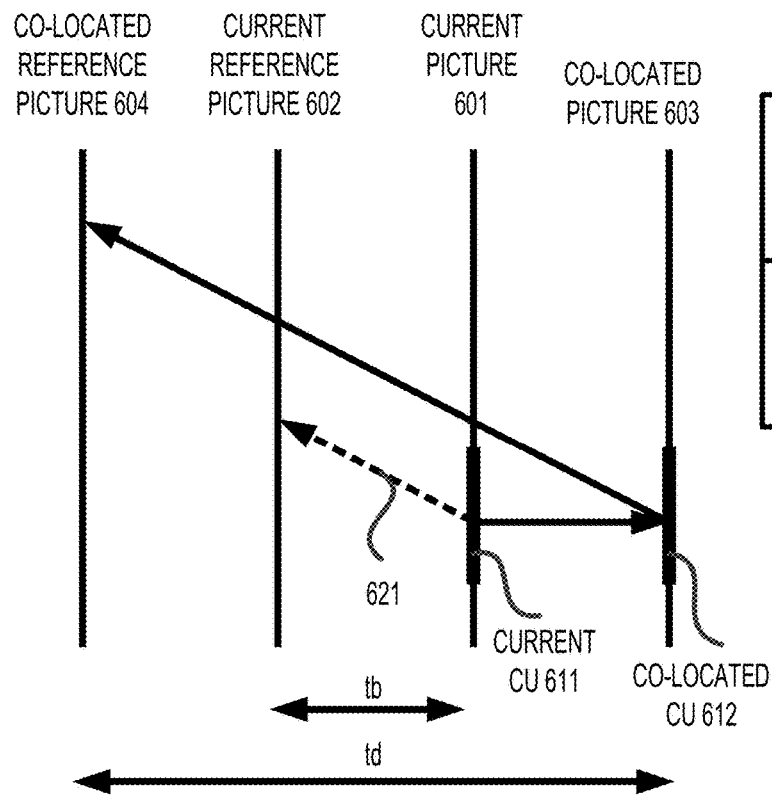
FIG. 6 shows example motion vector scaling for a temporal merge candidate.

In an embodiment, temporal candidate(s) are derived as follows. In an example, only one temporal merge candidate is added to the candidate list. FIG. 6 shows example motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero. The collocated picture is a reference picture that is used as the source picture for temporal motion information derivation. The collocated picture can be identified in one of two lists, referred to as list0 or list1. In some examples, the encoder can determine the collocated picture and signal the collocated picture using suitable syntax techniques.

Figure 7:
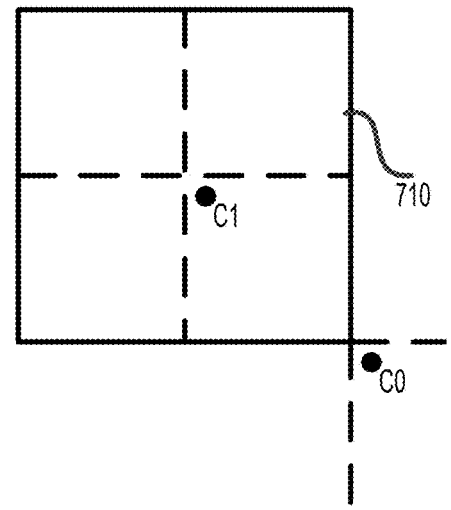
FIG. 7 shows example candidate positions for a temporal merge candidate of a current block.

FIG. 7 shows example candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

According to some aspects of the disclosure, formular based prediction methods can be used in inter prediction or intra prediction. For inter prediction, a formular based prediction method can use a formular to generate samples of the current block in a current picture based on reference samples of a reference block in a reference picture. For intra prediction, a formular based prediction method can use a formular to generate a first color component of the current block based a second color component of the current block. In some examples, parameters in a formular for a formular based prediction method can be derived based on a template of the current block.

In some examples, local illumination compensation (LIC) is used as an inter prediction technique to model local illumination variation between a current block and a prediction block (also referred to as reference block) of the current block by using a linear function. The prediction block is in a reference picture, and can be pointed by motion vector (MV). The parameters of a linear formular can include a scale α and an offset β, and the linear formular can be represented by α×p[x, y]+β to compensate illumination changes, where p[x, y] denotes a reference sample at a location [x, y] in the reference block (also referred to as prediction block), the reference block is pointed to by MV from the current block. In some examples, the scale α and the offset β can be derived based on a template of the current block and a corresponding reference template of the reference block by using the least square method, thus no signaling overhead is required, except that an LIC flag may be signaled to indicate the use of LIC. The scale α and the offset β that are derived based on the template of the current block can be referred to as template based parameter set.

In some examples, LIC is used for uni-prediction inter CUs. In some examples, intra neighbor samples (neighboring samples that are predicted using intra prediction) of the current block can be used in LIC parameter derivation. In some examples, LIC is disabled for blocks with less than 32 luma samples. In some examples, for non subblock modes (e.g., non affine modes), LIC parameter derivation is performed based on the template block samples of the current CU, instead of partial template block samples for the first top-left 16×16 unit. In some examples, LIC parameter derivation is performed based on partial template block samples, such as the partial template block samples for the first top-left 16×16 unit. In some examples, template samples of the reference block are determined by using motion compensation (MC) with the MV of the block without rounding it to integer-pel precision.

In some examples, cross component prediction can be used as an intra prediction technique. The cross-component prediction can include a first technique referred to as cross component linear model (CCLM), a second technique referred to as multi-model linear model (MMLM), a third technique referred to as convolutional cross-component model (CCCM), and a fourth technique referred to as gradient linear model (GLM).

For example, the first technique CCLM is used to reduce the cross-component redundancy. In the CCLM, the chroma samples are predicted based on the reconstructed luma samples of the same CU by using a linear model (also referred to as linear formular), such as using Eq. (1):

$$pred_C(i, j) = a \cdot rec'_L(i, j) + b \qquad \text{Eq. (1)}$$

where $pred_C(i, j)$ represents the predicted chroma samples in a CU and $rec'_L(i, j)$ represents the downsampled reconstructed luma samples of the same CU. The CCLM linear model includes parameters (a and b) that can be derived, in an example, with at most four neighbouring chroma samples and their corresponding down-sampled luma samples. In an example, the at most four neighbouring chroma samples and their corresponding down-sampled luma samples are referred to as templates of the CU.

In some examples, based on the location of the neighboring chroma samples, CCLM can include different modes that is referred to as LM_T (LM top mode or above mode LM_A), LM_L (LM left mode) and LM_LT (LM left top mode or left above mode LM_LA or just LM mode). For example, the dimensions of the current chroma block are W×H, then W' and H' can be set for various modes in CCLM. When LM mode (also referred to as LM_LT or LM_LA) is applied, W'=W, H'=H; when LM-A mode is applied, W'=W+H; when LM-L mode is applied, H'=H+W.

It is noted that MMLM, CCCM and GLM also use functions for prediction. Parameters of the functions can be derived based on templates.

It is noted that following description uses inter prediction to illustrate techniques to derive coded information for formular based prediction methods, and the techniques can be suitably used to derive coded information for intra prediction.

According to some aspects of the disclosure, some inter prediction techniques are designed to minimize the distortion between the current block and its prediction block in the corresponding reference picture. For example, an inter prediction technique (also referred to as a first method of inter prediction method, formular based inter prediction technique, function based inter prediction technique, or model based inter prediction technique) can apply a formular, such as a non-linear formular, a linear formular and the like, using an original prediction block in the reference picture as input of the formular to generate a current block in a current picture. For example, an inter prediction technique can generate a prediction of a sample in a current block based on a formular with one or more predicted samples in a reference picture as inputs. The formular can include linear terms or non-linear terms, and can include one or more parameters that can be derived. It is noted that LIC is one of such inter prediction techniques.

In some examples, the formular is a linear formular, and can be represented by $\Sigma_{i=0}^{n}(\alpha_i \times p(x_i, y_i)) + \beta$, where n is a non-negative integer number, and $p(x_i, y_i)$ is a predicted sample at a location $(x_i, y_i)$ in the reference picture, the predicted sample is pointed based on an MV associated with the current block. Further, a group of predicted samples that are represented by $p(x_i, y_i)$, where i=0, . . . , n, can be a group of predicted samples around a corresponding sample in the reference sample that are point by the MV based on a current sample to be predicted. In some examples, the parameter $\alpha_i$ and $\beta$ can be derived based on a template of the current block (also referred to as current block template) and a template of a prediction block (also referred to as prediction block template) for the current block (e.g., by using the least square method) by minimizing the difference between current block template and its prediction block template. The template of the current block is composed of the spatial neighboring reconstructed samples of the current block, the template of the prediction block is composed of the spatial neighboring reconstructed samples of the prediction block.

Figure 8:
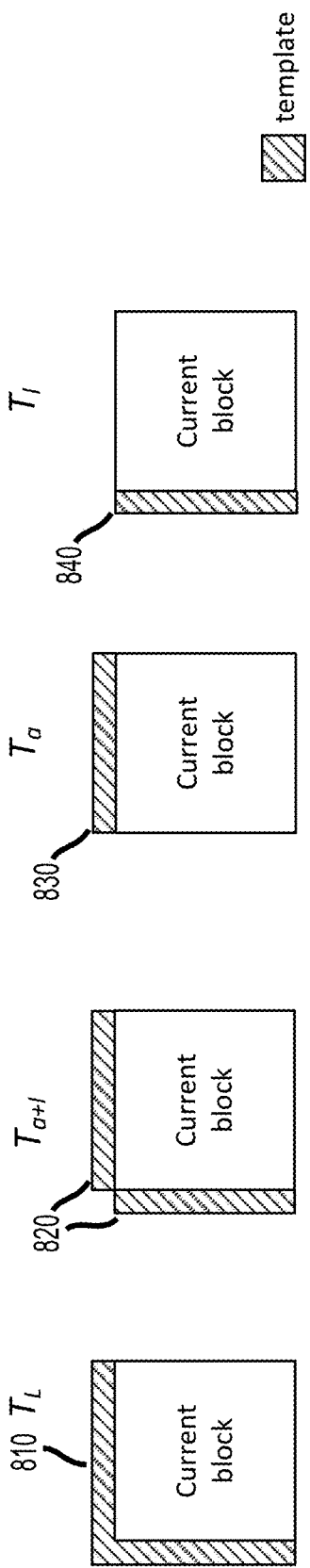
FIG. 8 shows diagrams of templates in some examples.

FIG. 8 shows diagrams of templates in some examples. For example, the template (810) is referred to as an L-shaped template $T_L$ and includes neighboring samples in an above row, a left column and at above-left corner of the current block (also referred to as current coded block); the template (820) is referred to as above and left template $T_{a+l}$ and includes neighboring samples in an above row and a left column of the current block; the template (830) is referred to as above template $T_a$ and includes neighboring samples in an above row of the current block; and the template (840) is referred to as left template $T_l$ and includes neighboring samples in a left column of the current block. It is noted that a template can include neighboring samples of other suitable shape not shown in FIG. 8.

In some examples, multiple candidate template types can also be supported, and one candidate template type is selected to derive the parameters of the linear formular. A syntax can be signaled in the bitstream (e.g., at the block level) to indicate which candidate template type is selected.

In some examples, a control flag can be signaled in the bitstream (e.g., at the block level) in association with a formular based inter prediction technique to indicate whether the formular based inter prediction technique is applied on the current block or not. Alternatively, the value of the control flag can also be inherited from the other coded block. More specifically, a first control flag of the formular based inter prediction technique associated with the current block is inherited from a second control flag of the formular based inter prediction technique associated with another one or multiples coded blocks. Moreover, the control flag can be derived at the coding block level to adaptively determine whether the formular based inter prediction technique is applied or not.

In some examples, a first control flag of a formular based inter prediction technique associated with the current block is inherited from a second control flag of the formular based inter prediction technique associated with another one or multiples coded blocks. In some examples, the coded information of the formular based inter prediction technique can be derived from adjacent coded block, non-adjacent coded block, or the coded blocks which store the coded information within the buffer.

It is noted that, in the present disclosure, without limitation of the generality, in an example, the term parameter refers to the parameters $\alpha_i$ and $\beta$ used to determine the linear formular for deriving the prediction block. The term template type refers to different template shapes, such as but no limited to one of the template types shown in FIG. 8 for the parameter derivation in the non-linear formular or linear formular.

Some aspects of the disclosure provide techniques for improvement of information derivation for formular based inter prediction technique and can improve coding efficiency of inter prediction. For example, encoder/decoder can construct a candidate list including one or more coded blocks associated with the current block. In some examples, the one or more coded blocks including at least a non-adjacent spatial neighboring block of the current block. A coded block in the one or more coded blocks is a candidate that provides formular based inter prediction information of the formular based inter prediction technique. Further, a first coded block is selected from the candidate list, the first coded block is coded with first formular based inter prediction information of the formular based inter prediction technique. Then, current formular based inter prediction information for the current block is determined based on the first formular based inter prediction information, and one or more parameter values of the one or more parameters for applying the formular based inter prediction technique on the current block can be derived according to the current formular based inter prediction information.

Some aspects of the present disclosure provide techniques to construct a first-in-first-out (FIFO) queue for storing the formular based inter prediction information of coded blocks, e.g., historical formular based inter prediction information of blocks that are coded using the formular based inter prediction technique. The formular based inter prediction information of a coded block refers to the information that enables the use of the formular based inter prediction technique on the coded block, such as the template type, the formular type, and the like. In some examples, when a current block is reconstructed during encoding/decoding using the formular based inter prediction technique (e.g., the control flag for the formular based inter prediction technique is true), the information of the formular based inter prediction technique for the current block is stored into the FIFO queue, and can be used for encoding/decoding subsequent blocks.

In some examples, the FIFO queue is defined with a fixed size. In an example, when the FIFO queue has space, for example the occupied size of the FIFO queue is smaller than the fixed size of the FIFO queue, the information of the formular based inter prediction technique of a current block that has been coded with the formular based inter prediction technique can be pushed into the FIFO queue. In another example, the oldest information of the formular based inter prediction technique can be popped out before the insertion of the new information of the formular based inter prediction technique of the current block when the current block is coded (e.g., encoded or decoded) using the formular based inter prediction technique, and the total occupied size for the stored information of the formular based inter prediction technique is equal to the fixed size of the FIFO queue.

In some embodiments, the FIFO queue for the formular based inter prediction technique is reset at the beginning of the frame encoding/decoding. In an example, at the beginning of a frame encoding/decoding, the FIFO queue is reset to be empty.

In some embodiments, the FIFO queue for the formular based inter prediction technique is reset at the beginning of a row of the coded tree unit (CTU) or superblock (SB). For example, at the beginning of a row of CTU or SB, the FIFO queue for the formular based inter prediction technique is reset to be empty.

In some embodiments, the FIFO queue for the formular based inter prediction technique is reset at slice level, tile level, or segment level. In an example, at the beginning of a slice, the FIFO queue for the formular based inter prediction technique is reset to be empty. In another example, at the beginning of a tile, the FIFO queue for the formular based inter prediction technique is reset to be empty. In another example, at the beginning of a segment, the FIFO queue for the formular based inter prediction technique is reset to be empty.

Some aspects of the disclosure provide techniques to construct a candidate list with formular based inter prediction information from coded blocks associated with a current block, such as one or more adjacent spatial neighboring coded blocks of the current block, one or more non-adjacent spatial neighboring coded blocks of the current block, a temporal collocated coded block from a reference picture for the current block, and the FIFO queue for the formular based inter prediction technique, and the like. In some examples, an index can be signaled in the bitstream to indicate which coded block in the candidate list provides the formular based inter prediction information to be applied on the current block when the formular based inter prediction technique is applied on the current block.

In some embodiments, a flag (e.g., list usage flag) is signaled in the bitstream to indicate whether the candidate list is used or not to provide the formular based inter prediction information for the current block. When the flag is true, the candidate list is used, and then an index is signal in the bitstream to indicate which coded block in the candidate list provides the formular based inter prediction information to be applied on the current block. Otherwise, the flag is false, the candidate list is not used, the formular based inter prediction information to be applied on the current block can be the derived and/or can be signaled in the bitstream. In an example, the formular based inter prediction information to be applied on the current block is directed signaled in the bitstream. In another example, the formular based inter prediction information to be applied on the current block is derived without additional signaling in the bitstream.

In an embodiment, the candidate list of the formular based inter prediction information is constructed in a predefined scanning order from at least one of following candidates: the adjacent spatial neighboring coded block(s), the FIFO queue, the non-adjacent spatial neighboring coded block(s), and the temporal collocated coded block from the reference picture. In some examples, the candidate list includes coded blocks according to following order: one or more adjacent spatial neighboring coded blocks of the current block, the FIFO queue that stores historical data of the formular based inter prediction information, one or more non-adjacent spatial neighboring coded blocks, and the temporal collocated coded block from the reference picture.

In an embodiment, the adjacent spatial neighboring coded blocks are scanned first, and then the first FIFO queue is inserted when the first FIFO queue is not empty. Further, the availability of one or more non-adjacent spatial neighboring coded blocks for providing the formular based inter prediction information is checked and the availability of the temporal collocated coded block from the reference picture for providing the formular based inter prediction information is checked consequently.

In some examples, the flag for the list usage is signaled to indicate whether the candidate list is used to provide the formular based inter prediction information for the current block. When the flag is true, the candidate list is used, and then an index (also referred to as a first index) is signaled in the bitstream to indicate which coded block in the candidate list is used to provide the formular based inter prediction information of the current block. Otherwise, when the flag is false, the derived and/or signaled formular based inter prediction information is used for the current block. In an example, when the flag is false, the formular based inter prediction information to be applied on the current block is decoded from the bitstream. In another example, when the flag is false, the formular based inter prediction information to be applied on the current block is derived without additional signaling in the bitstream.

In some embodiments, the candidate list can be reordered based on the cost values of the template matching in ascending order. In some examples, the coded information of each candidate is applied on the template in the prediction block for each candidate to calculate the template matching cost. For example, for a candidate (e.g., a coded block) in the candidate list, the formular based inter prediction information of the candidate is used to determine a candidate formular to be used in the formular based inter prediction technique for the current block.

Further, reconstructed samples of the reference template of the reference block for the current block can be input to the candidate formular to generate a candidate template. In an example, a difference measure between the candidate template and the current template of the current block is calculated to be the template matching cost value for the candidate. In some examples, the candidates (e.g., coded blocks) in the candidate list are reordered in an ascending order of the template matching cost values associated with the candidates.

According to some aspects of the disclosure, the functions of the list usage flag and the index can be combined into a single index (also referred to as a second index). In some embodiments, the derived and/or signaled formular based inter prediction information is put at the beginning of the candidate list, for example as the first candidate corresponding to index value 0. One or more coded blocks are put in the candidate list after the first candidate. Then, the second index is signaled to indicate which candidate in the candidate list is used. When the second index has 0 value in an example, the derived and/or signaled formular based inter prediction information is used for applying the formular based inter prediction technique on the current block. When the second index is larger than 0, a coded block is selected from the one or more coded block in the candidate list to provide the formular based inter prediction information for applying the formular based inter prediction technique on the current block.

In an embodiment, the candidate list can be reordered based on the cost of the template matching in ascending order and the derived and/or signaled formular based inter prediction information is always put at the beginning of the candidate list. In some examples, the candidate list includes a first candidate at the beginning of the candidate list and one or more coded blocks that are candidates after the first candidate. The first candidate indicates the derived and/or signaled formular based inter prediction information. The one or more coded blocks can be reordered in an ascending order of the template matching cost values associated with the one or more coded blocks. For example, for a coded block in the candidate list, the formular based inter prediction information of the coded block is used to determine a candidate formular to be used in the formular based inter prediction technique for the current block. Further, reconstructed samples of the reference template of the reference block for the current block can be input to the candidate formular to generate a candidate template. In an example, a difference measure between the candidate template and the current template of the current block is calculated to be the template matching cost value for the coded block. In some examples, the one or more coded blocks in the candidate list are reordered in an ascending order of the template matching cost values associated with the one or more coded blocks.

Figure 9:
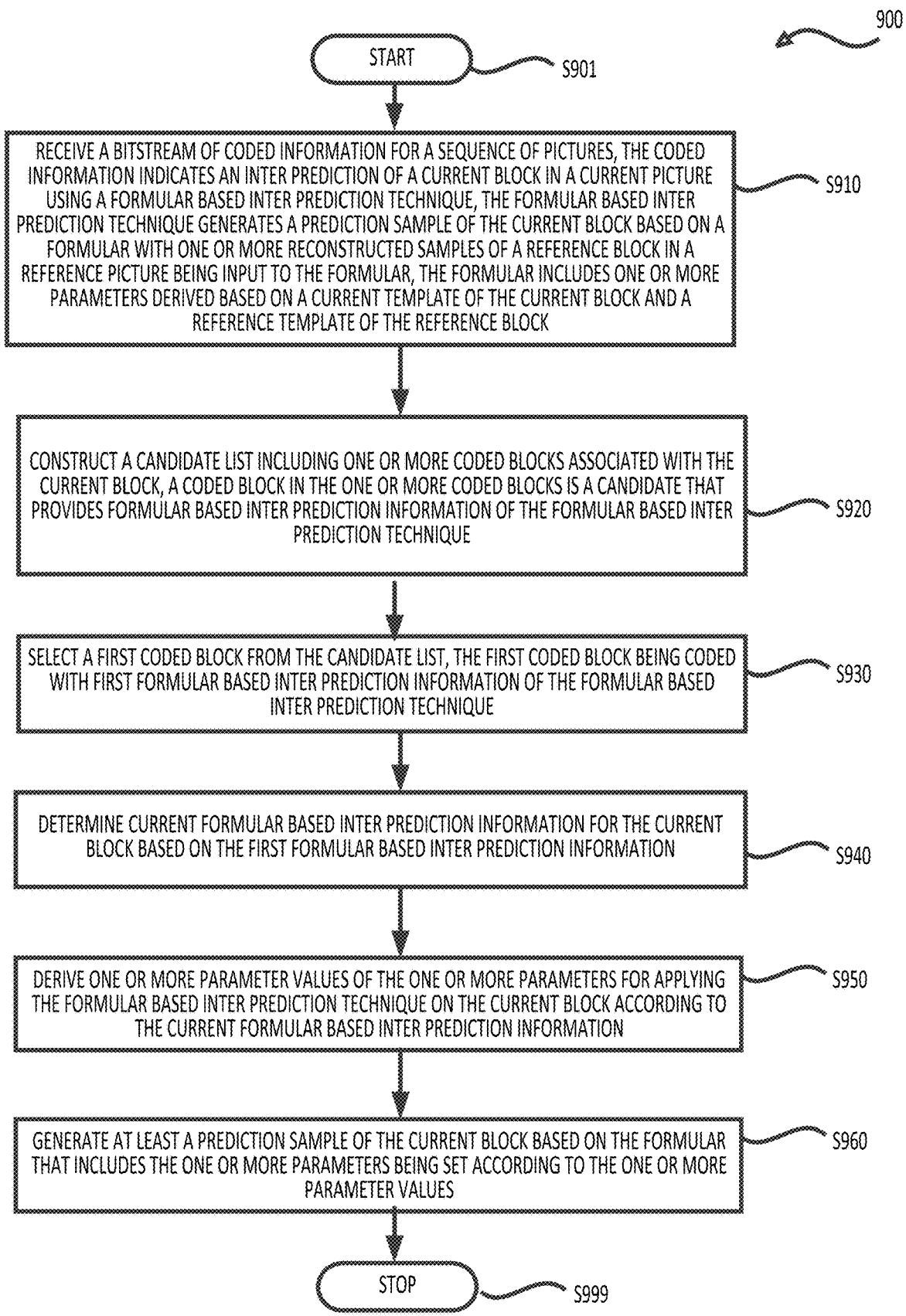
FIG. 9 shows a flow chart outlining a decoding process according to some aspects of the disclosure.

FIG. 9 shows a flow chart outlining a process (900) according to an aspect of the disclosure. The process (900) can be used in a video decoder. In various aspects, the process (900) is executed by processing circuitry, such as the processing circuitry that performs functions of the video decoder (110), the processing circuitry that performs functions of the video decoder (210), and the like. In some aspects, the process (900) is implemented in software instructions, thus when the processing circuitry executes the software instructions, the processing circuitry performs the process (900). The process starts at (S901) and proceeds to (S910).

At (S910), a bitstream of coded information for a sequence of pictures is received, the coded information indicates an inter prediction of a current block in a current picture using a formular based inter prediction technique. The formular based inter prediction technique generates a prediction sample of the current block based on a formular with one or more reconstructed samples of a reference block in a reference picture being input to the formular, the formular includes one or more parameters derived based on a current template of the current block and a reference template of the reference block.

At (S920), a candidate list including one or more coded blocks associated with the current block is constructed. A coded block in the one or more coded blocks is a candidate that provides formular based inter prediction information of the formular based inter prediction technique.

At (S930), a first coded block is selected from the candidate list, the first coded block is coded with first formular based inter prediction information of the formular based inter prediction technique.

At (S940), current formular based inter prediction information for the current block is determined based on the first formular based inter prediction information. For example, the current block inherits the first formular based inter prediction information from the first coded block, thus the current formular based inter prediction information is set to be the same as the first formular based inter prediction information.

At (S950), one or more parameter values of the one or more parameters for applying the formular based inter prediction technique on the current block are derived according to the current formular based inter prediction information.

At (S960), at least a prediction sample of the current block is generated based on the formular that includes the one or more parameters being set according to the one or more parameter values.

In some examples, the formular based inter prediction technique is local illumination compensation (LIC). In some examples, the one or more coded blocks include at least one of an adjacent spatial neighboring coded block, a non-adjacent spatial neighboring block and/or a temporal collocated coded block of the current block in the reference picture.

In some embodiments, the candidate list is constructed from a first-in-first-out (FIFO) queue, the FIFO queue stores historical formular based inter prediction information of one or more historical coded blocks that are coded prior to the current block using the formular based inter prediction technique.

In some examples, the current formular based inter prediction information applied on the current block is stored into the FIFO queue in a FIFO manner. When the number of stored historical coded blocks is equal to the size of the FIFO queue, the oldest historical coded block is popped out, and the current block with the current formular based inter prediction information is inserted into the FIFO queue.

In an example, the FIFO queue is reset (e.g., is set to be empty) at a beginning of a frame. In another example, the FIFO queue is reset at a beginning of a CTU row. In another example, the FIFO queue is reset at a beginning of a superblock SB) row. In another example, the FIFO queue is reset at a beginning of a slice. In another example, the FIFO queue is reset at a beginning of a tile. In another example, the FIFO queue is reset at a beginning of a segment.

In some examples, a first flag is decoded from the bitstream, the first flag indicates whether the candidate list is used for determining the current formular based inter prediction information. When the first flag is true, an index is decoded from the bitstream, the index indicates the first coded block in the candidate list. The first formular based inter prediction information of the first coded block is used to determine the current formular based inter prediction information. When the first flag is false, the current formular based inter prediction information is determined without using the candidate list. In an example, the current formular based inter prediction information of the formular based inter prediction technique is directly decoded from the bitstream. In another example, the current formular based inter prediction information of the formular based inter prediction technique is derived without additional signaling in the bitstream.

In some examples, the candidate list is constructed according to a scanner order of at least one of at least an adjacent spatial neighboring coded block, a FIFO queue storing historical coded blocks by the formular based inter prediction technique, at least a non-adjacent spatial neighboring block and/or a temporal collocated coded block of the current block in the reference picture. In an example, whether the adjacent spatial neighboring coded block is coded with the formular based inter prediction technique is checked. The adjacent spatial neighboring coded block is inserted into the candidate list when the adjacent spatial neighboring coded block is coded with the formular based inter prediction technique. Further, whether the FIFO queue is empty is checked. The FIFO queue is inserted into the candidate list when the FIFO queue is not empty. Further, whether the non-adjacent spatial neighboring block is coded with the formular based inter prediction technique is checked. The non-adjacent spatial neighboring block is inserted into the candidate list when the non-adjacent spatial neighboring block is coded with the formular based inter prediction technique. Then, whether the temporal collocated coded block of the current block in the reference picture is coded with the formular based inter prediction technique is checked. The temporal collocated coded block is inserted into the candidate list when the temporal collocated coded block is coded with the formular based inter prediction technique.

In some examples, template matching costs respectively for the one or more coded blocks are calculated. For example, for a coded block that is a candidate in the candidate list, a candidate formular can be determined according to the formular based inter prediction information associated with the coded block. Then, the template (reconstructed samples in the template area) of the reference block (prediction block) is input to the candidate formular to generate a test template of the current block. In some examples, a difference measure of the test template and the current template of the current block is calculated as a template matching cost associated with the coded block.

In some examples, the one or more coded blocks in the candidate list can be re-ordered according to the template matching costs. For example, the one or more coded blocks are reordered with the template matching cost in an ascending order.

In some examples, the first flag is not used. The candidate list is constructed to have a first candidate at a beginning position of the candidate list and the one or more coded blocks after the first candidate, the first candidate indicates a use of a derivation and/or a direct signaling of the current formular based inter prediction information. For example, an index is decoded from the bitstream. When the index indicates the first candidate, the current formular based inter prediction information is determined without using the formular based inter prediction information of the one or more coded blocks. In an example, when the index indicates the first candidate, the current formular based inter prediction information of the formular based inter prediction technique is directly decoded from the bitstream. In another example, when the index indicates the first candidate, the current formular based inter prediction information of the formular based inter prediction technique is derived without additional signaling from the bitstream.

In some examples, template matching costs respectively for the one or more coded blocks are calculated, and the one or more coded blocks in the candidate list after the first candidate are reordered according to the template matching costs.

In some examples, the formular based inter prediction information includes at least one of a template type and a formular type.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
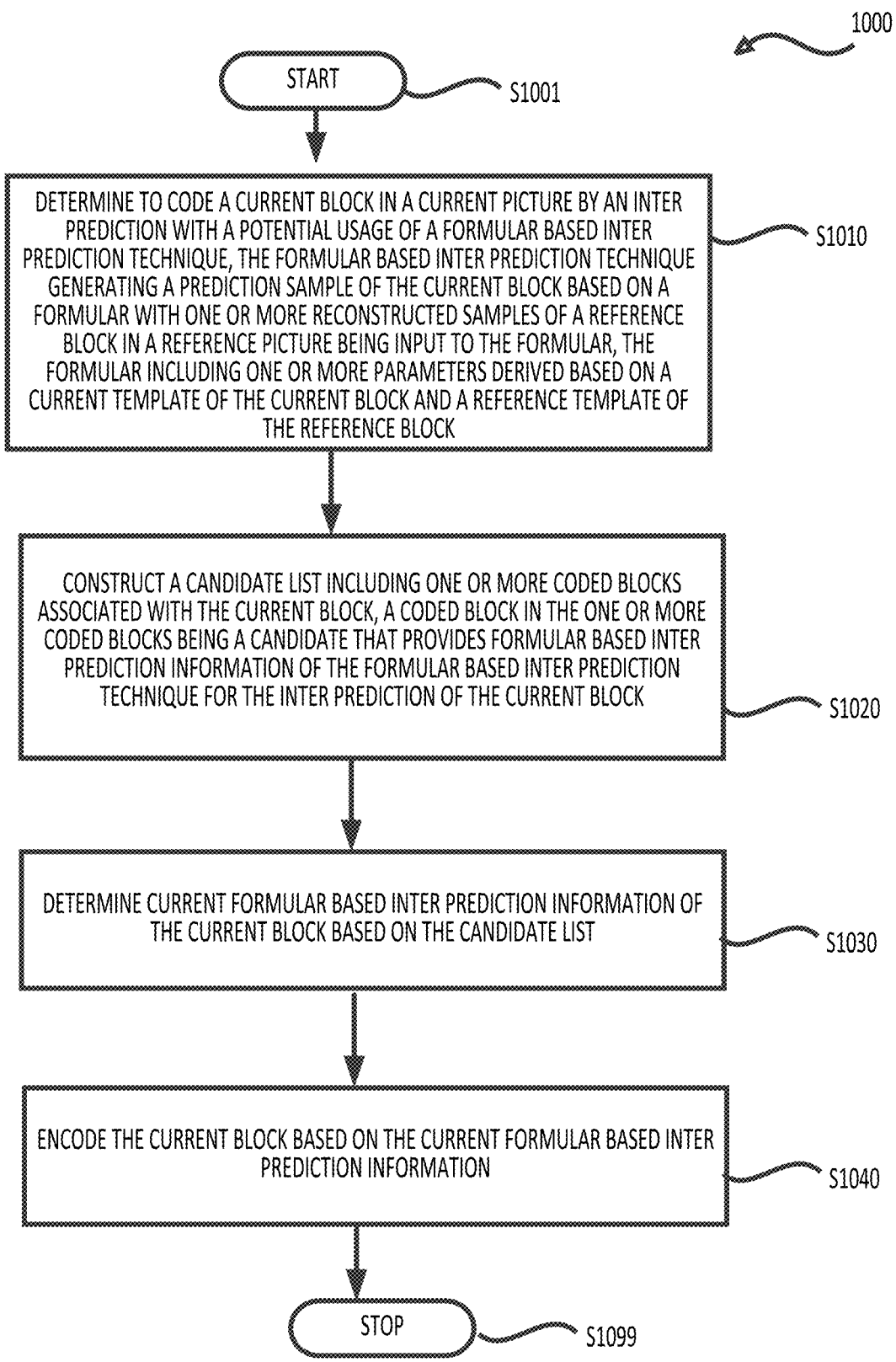
FIG. 10 shows a flow chart outlining an encoding process according to some aspects of the disclosure.

FIG. 10 shows a flow chart outlining a process (1000) according to an aspect of the disclosure. The process (1000) can be used in a video encoder. In various aspects, the process (1000) is executed by processing circuitry, such as the processing circuitry that performs functions of the video encoder (103), the processing circuitry that performs functions of the video encoder (303), and the like. According to some aspects, the process (1000) is implemented in software instructions, thus when the processing circuitry executes the software instructions, the processing circuitry performs the process (1000). The process starts at (S1001) and proceeds to (S1010).

At (S1010), to code a current block in a current picture by an inter prediction with a potential usage of a formular based inter prediction technique is determined. The formular based inter prediction technique generates a prediction sample of the current block based on a formular with one or more reconstructed samples of a reference block in a reference picture being input to the formular, the formular includes one or more parameters derived based on a current template of the current block and a reference template of the reference block.

At (S1020), a candidate list including one or more coded blocks associated with the current block is constructed. A coded block in the one or more coded blocks is a candidate that provides formular based inter prediction information of the formular based inter prediction technique for the inter prediction of the current block.

At (S1030), current formular based inter prediction information of the current block is determined based on the candidate list. In some examples, an evaluation, such as rate distortion evaluation, can be used to determine the current formular based inter prediction information from the candidate list.

At (S1040), the current block is encoded according to the current formular based inter prediction information. Coded information of the current block to be included in a bitstream is generated. For example, the coded information can include flag and/or index indicative of a candidate in the candidate list that provides the current formular based inter prediction information.

In some examples, the formular based inter prediction technique is local illumination compensation (LIC). In some examples, the one or more coded blocks include at least one of an adjacent spatial neighboring coded block, a non-adjacent spatial neighboring block and/or a temporal collocated coded block of the current block in the reference picture.

In some embodiments, the candidate list is constructed from a first-in-first-out (FIFO) queue, the FIFO queue stores historical formular based inter prediction information of one or more historical coded blocks that are coded prior to the current block using the formular based inter prediction technique.

In some examples, the current formular based inter prediction information applied on the current block is stored into the FIFO queue in a FIFO manner. When the number of stored historical coded blocks is equal to the size of the FIFO queue, the oldest historical coded block is popped out, and the current block with the current formular based inter prediction information is inserted into the FIFO queue.

In an example, the FIFO queue is reset (e.g., is set to be empty) at a beginning of a frame. In another example, the FIFO queue is reset at a beginning of a CTU row. In another example, the FIFO queue is reset at a beginning of a superblock SB) row. In another example, the FIFO queue is reset at a beginning of a slice. In another example, the FIFO queue is reset at a beginning of a tile. In another example, the FIFO queue is reset at a beginning of a segment.

In some examples, it is determined to use first formular based inter prediction information of a first coded block from the candidate list as the current formular based inter prediction information of the current block. Then, a first flag with a true value and an index are encoded into a bitstream carrying coded information of a sequence of pictures, the first flag with the true value indicates that the current formular based inter prediction information is determined from the candidate list, and the index indicates the first coded block.

In some examples, not to use the one or more coded blocks from the candidate list to determine the current formular based inter prediction information is determined. The first flag with a false value is then encoded in the bitstream, the first flag with the false value indicates that the current formular based inter prediction information is not determined from the one or more coded blocks in the candidate list.

In an example, when the first flag is of the false value, the current formular based inter prediction information of the formular based inter prediction technique is directly encoded into the bitstream.

In some examples, the candidate list is constructed according to a scanner order of at least one of at least an adjacent spatial neighboring coded block, a FIFO queue storing historical coded blocks by the formular based inter prediction technique, at least a non-adjacent spatial neighboring block and/or a temporal collocated coded block of the current block in the reference picture. In an example, whether the adjacent spatial neighboring coded block is coded with the formular based inter prediction technique is checked. The adjacent spatial neighboring coded block is inserted into the candidate list when the adjacent spatial neighboring coded block is coded with the formular based inter prediction technique. Further, whether the FIFO queue is empty is checked. The FIFO queue is inserted into the candidate list when the FIFO queue is not empty. Further, whether the non-adjacent spatial neighboring block is coded with the formular based inter prediction technique is checked. The non-adjacent spatial neighboring block is inserted into the candidate list when the non-adjacent spatial neighboring block is coded with the formular based inter prediction technique. Then, whether the temporal collocated coded block of the current block in the reference picture is coded with the formular based inter prediction technique is checked. The temporal collocated coded block is inserted into the candidate list when the temporal collocated coded block is coded with the formular based inter prediction technique.

In some examples, template matching costs respectively for the one or more coded blocks are calculated. For example, for a coded block that is a candidate in the candidate list, a candidate formular can be determined according to the formular based inter prediction information associated with the coded block. Then, the template (reconstructed samples in the template area) of the reference block (prediction block) is input to the candidate formular to generate a test template of the current block. In some examples, a difference measure of the test template and the current template of the current block is calculated as a template matching cost associated with the coded block.

In some examples, the one or more coded blocks in the candidate list can be re-ordered according to the template matching costs. For example, the one or more coded blocks are reordered with the template matching cost in an ascending order.

In some examples, the first flag is not used. The candidate list is constructed to have a first candidate at a beginning position of the candidate list and the one or more coded blocks after the first candidate, the first candidate indicates a use of a derivation and/or a direct signaling of the current formular based inter prediction information. For example, an index is encoded into the bitstream. When the index indicates the first candidate, the current formular based inter prediction information is determined without using the formular based inter prediction information of the one or more coded blocks. In an example, when the index indicates the first candidate, the current formular based inter prediction information of the formular based inter prediction technique is directly encoded into the bitstream.

In some examples, template matching costs respectively for the one or more coded blocks are calculated, and the one or more coded blocks in the candidate list after the first candidate are reordered according to the template matching costs.

In some examples, the formular based inter prediction information includes at least one of a template type and a formular type.

Then, the process proceeds to (S1099) and terminates.

The process (1000) can be suitably adapted. Step(s) in the process (1000) can be modified and/or omitted. Additional step(s) can be added. Any suitable order of implementation can be used.

According to an aspect of the disclosure, a method of processing visual media data is provided. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a sequence of pictures, the coded information indicates an inter prediction of a current block in a current picture using a formular based inter prediction technique, the formular based inter prediction technique generates a prediction sample of the current block based on a formular with one or more reconstructed samples of a reference block in a reference picture being input to the formular, the formular includes one or more parameters derived based on a current template of the current block and a reference template of the reference block. The format rule specifies that a candidate list including one or more coded blocks associated with the current block is constructed, a coded block in the one or more coded blocks is a candidate that provides formular based inter prediction information of the formular based inter prediction technique. The format rule also specifics that first coded block is selected from the candidate list, the first coded block is coded with first formular based inter prediction information of the formular based inter prediction technique. The format rule also specifies that current formular based inter prediction information for the current block is determined based on the first formular based inter prediction information, one or more parameter values of the one or more parameters for applying the formular based inter prediction technique on the current block are determined according to the current formular based inter prediction information, and at least a sample of the current block is reconstructed according to the formular based inter prediction technique with the one or more parameter values. For example, at least a prediction sample of the current block is generated based on the formular that includes the one or more parameters being set according to the one or more parameter values.

The techniques described above, can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
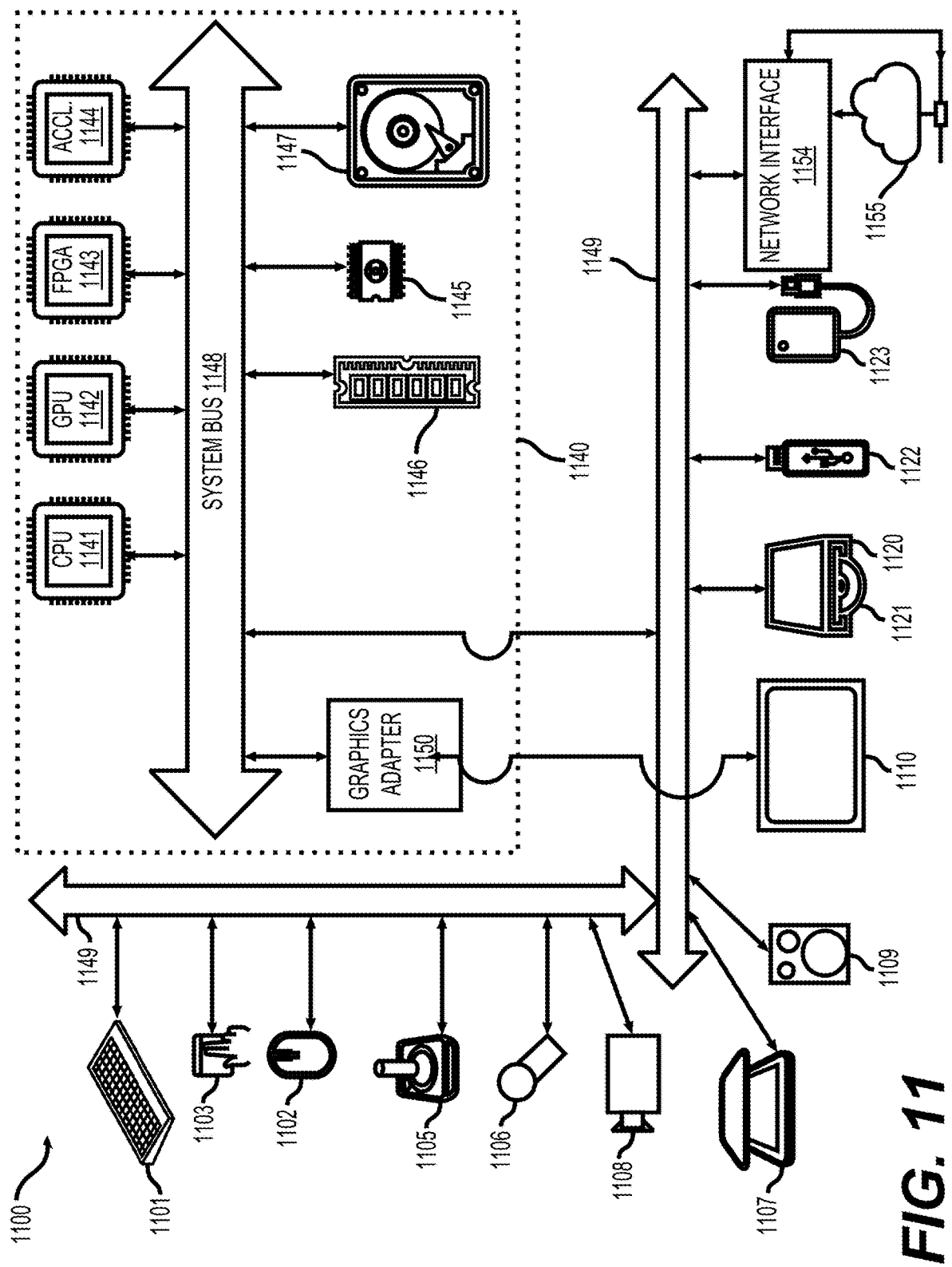
FIG. 11 is a schematic illustration of a computer system in accordance with an aspect.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical.

Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
 receiving a bitstream of coded information for a sequence of pictures, the coded information indicating an inter prediction of a current block in a current picture using a formular based inter prediction technique, the formular based inter prediction technique generating a prediction sample of the current block based on a formular with one or more reconstructed samples of a reference block in a reference picture being input to the formular, the formular including one or more parameters derived based on a current template of the current block and a reference template of the reference block;
 constructing a candidate list including one or more coded blocks associated with the current block, a coded block in the one or more coded blocks being a candidate that provides formular based inter prediction information of the formular based inter prediction technique;

selecting a first coded block from the candidate list, the first coded block being coded with first formular based inter prediction information of the formular based inter prediction technique;

determining current formular based inter prediction information for the current block based on the first formular based inter prediction information;

deriving one or more parameter values of the one or more parameters for applying the formular based inter prediction technique on the current block according to the current formular based inter prediction information; and generating at least the prediction sample of the current block based on the formular that includes the one or more parameters being set according to the one or more parameter values.

2. The method of claim 1, wherein the one or more coded blocks include at least one of an adjacent spatial neighboring coded block, a non-adjacent spatial neighboring block and/or a temporal collocated coded block of the current block in the reference picture.

3. The method of claim 1, wherein the constructing the candidate list further comprises:

constructing the candidate list from a first-in-first-out (FIFO) queue, the FIFO queue storing historical formular based inter prediction information of one or more historical coded blocks that are coded prior to the current block using the formular based inter prediction technique.

4. The method of claim 3, further comprising:

storing the current formular based inter prediction information applied on the current block into the FIFO queue in a FIFO manner.

5. The method of claim 3, further comprising at least one of:

resetting the FIFO queue at a beginning of a frame;
resetting the FIFO queue at a beginning of a coding tree unit (CTU) row;
resetting the FIFO queue at a beginning of a superblock (SB) row;
resetting the FIFO queue at a beginning of a slice;
resetting the FIFO queue at a beginning of a tile; and/or
resetting the FIFO queue at a beginning of a segment.

6. The method of claim 1, wherein the selecting the first coded block comprises:

decoding a first flag from the bitstream;
when the first flag is true, decoding an index from the bitstream, the index indicating the first coded block in the candidate list; and
when the first flag is false, determining the current formular based inter prediction information without using the candidate list.

7. The method of claim 6, wherein when the first flag is false, the method comprises at least one of:

decoding the current formular based inter prediction information of the formular based inter prediction technique from the bitstream; and/or
deriving the current formular based inter prediction information of the formular based inter prediction technique without additional signaling in the bitstream.

8. The method of claim 1, wherein the constructing the candidate list further comprises:

constructing the candidate list according to a scanner order of at least one of at least an adjacent spatial neighboring coded block, a first-in-first-out (FIFO) queue storing prior coded blocks by the formular based inter prediction technique, at least a non-adjacent spatial neighboring block and/or a temporal collocated coded block of the current block in the reference picture.

9. The method of claim 8, wherein the constructing the candidate list further comprises:

checking whether the adjacent spatial neighboring coded block is coded with the formular based inter prediction technique;
inserting the adjacent spatial neighboring coded block into the candidate list when the adjacent spatial neighboring coded block is coded with the formular based inter prediction technique;
checking whether the FIFO queue is empty;
inserting the FIFO queue into the candidate list when the FIFO queue is not empty;
checking whether the non-adjacent spatial neighboring block is coded with the formular based inter prediction technique;
inserting the non-adjacent spatial neighboring block into the candidate list when the non-adjacent spatial neighboring block is coded with the formular based inter prediction technique;
checking whether the temporal collocated coded block of the current block in the reference picture is coded with the formular based inter prediction technique; and
inserting the temporal collocated coded block into the candidate list when the temporal collocated coded block is coded with the formular based inter prediction technique.

10. The method of claim 1, wherein the constructing the candidate list further comprises:

calculating template matching costs respectively for the one or more coded blocks; and
reordering the one or more coded blocks in the candidate list according to the template matching costs.

11. The method of claim 1, wherein the candidate list comprises a first candidate at a beginning position of the candidate list and the one or more coded blocks after the first candidate, the first candidate indicates a use of a derivation and/or a direct signaling of the current formular based inter prediction information, the selecting the first coded block comprises:

decoding an index from the bitstream; and
when the index indicates the first candidate, determining the current formular based inter prediction information without using the formular based inter prediction information of the one or more coded blocks.

12. The method of claim 11, wherein when the index indicates the first candidate, the method comprises at least one of:

decoding the current formular based inter prediction information of the formular based inter prediction technique from the bitstream; and/or
deriving the current formular based inter prediction information of the formular based inter prediction technique without additional signaling from the bitstream.

13. The method of claim 11, further comprising:

calculating template matching costs respectively for the one or more coded blocks; and
reordering the one or more coded blocks in the candidate list after the first candidate according to the template matching costs.

14. The method of claim 1, wherein the formular based inter prediction information comprises at least one of a template type and a formular type.

15. A method of video encoding, comprising:
- determining to code a current block in a current picture by an inter prediction with a potential usage of a formular based inter prediction technique, the formular based inter prediction technique generating a prediction sample of the current block based on a formular with one or more reconstructed samples of a reference block in a reference picture being input to the formular, the formular including one or more parameters derived based on a current template of the current block and a reference template of the reference block;
- constructing a candidate list including one or more coded blocks associated with the current block, a coded block in the one or more coded blocks being a candidate that provides formular based inter prediction information of the formular based inter prediction technique for the inter prediction of the current block;
- determining current formular based inter prediction information of the current block based on the candidate list;
- deriving one or more parameter values of the one or more parameters for applying the formular based inter prediction technique on the current block according to the current formular based inter prediction information;
- generating at least the prediction sample of the current block based on the formular that includes the one or more parameters being set according to the one or more parameter values; and
- encoding the current block based on at least the prediction sample.

16. The method of claim 15, wherein the one or more coded blocks include at least one of an adjacent spatial neighboring coded block, a non-adjacent spatial neighboring block and/or a temporal collocated coded block of the current block in the reference picture.

17. The method of claim 15, wherein the constructing the candidate list further comprises:
- constructing the candidate list from a first-in-first-out (FIFO) queue, the FIFO queue storing historical formular based inter prediction information of one or more historical coded blocks that are coded prior to the current block using the formular based inter prediction technique.

18. The method of claim 17, further comprising:
- storing the current formular based inter prediction information applied on the current block into the FIFO queue in a FIFO manner.

19. The method of claim 17, further comprising at least one of:
- resetting the FIFO queue at a beginning of a frame;
- resetting the FIFO queue at a beginning of a coding tree unit (CTU) row;
- resetting the FIFO queue at a beginning of a superblock (SB) row;
- resetting the FIFO queue at a beginning of a slice;
- resetting the FIFO queue at a beginning of a tile; and/or
- resetting the FIFO queue at a beginning of a segment.

20. A non-transitory computer-readable storage medium storing instructions which when executed by a processor cause the processor to perform:
- determining to code a current block in a current picture by an inter prediction with a potential usage of a formular based inter prediction technique, the formular based inter prediction technique generating a prediction sample of the current block based on a formular with one or more reconstructed samples of a reference block in a reference picture being input to the formular, the formular including one or more parameters derived based on a current template of the current block and a reference template of the reference block;
- constructing a candidate list including one or more coded blocks associated with the current block, a coded block in the one or more coded blocks being a candidate that provides formular based inter prediction information of the formular based inter prediction technique for the inter prediction of the current block;
- determining current formular based inter prediction information of the current block based on the candidate list;
- deriving one or more parameter values of the one or more parameters for applying the formular based inter prediction technique on the current block according to the current formular based inter prediction information;
- generating at least the prediction sample of the current block based on the formular that includes the one or more parameters being set according to the one or more parameter values;
- encoding the current block in a bitstream based on at least the prediction sample; and
- transmitting the bitstream.

* * * * *